US012595412B2

(12) United States Patent
Horiuchi et al.

(10) Patent No.: US 12,595,412 B2
(45) Date of Patent: *Apr. 7, 2026

(54) CERAMIC COMPOSITION AND METHOD FOR MANUFACTURING CERAMIC COMPOSITION

(71) Applicant: SHINKO ELECTRIC INDUSTRIES CO., LTD., Nagano (JP)

(72) Inventors: Michio Horiuchi, Nagano (JP); Yuichiro Shimizu, Nagano (JP)

(73) Assignee: SHINKO ELECTRIC IDUSTRIES CO., LTD., Nagano (JP)

( * ) Notice: Subject to any disclaimer, the term of this patent is extended or adjusted under 35 U.S.C. 154(b) by 811 days.

This patent is subject to a terminal disclaimer.

(21) Appl. No.: 17/903,474

(22) Filed: Sep. 6, 2022

(65) Prior Publication Data

US 2023/0072659 A1     Mar. 9, 2023

(30) Foreign Application Priority Data

Sep. 8, 2021     (JP) ................................. 2021-145985

(51) Int. Cl.
| | |
|---|---|
| *C09K 11/77* | (2006.01) |
| *C04B 35/117* | (2006.01) |
| *C04B 35/64* | (2006.01) |
| *C09K 11/02* | (2006.01) |

(52) U.S. Cl.
CPC ........ *C09K 11/7721* (2013.01); *C04B 35/117* (2013.01); *C04B 35/64* (2013.01); *C09K 11/02* (2013.01); *C04B 2235/3217* (2013.01); *C04B 2235/3229* (2013.01); *C04B 2235/602* (2013.01); *C04B 2235/652* (2013.01); *C04B 2235/6582* (2013.01); *C04B 2235/80* (2013.01); *C04B 2235/9646* (2013.01)

(58) Field of Classification Search
CPC ... C09K 11/7721; C09K 11/02; C04B 35/117; C04B 35/64; C04B 2235/3229; C04B 2235/3217; C04B 2235/602; C04B 2235/6582; C04B 2235/652; C04B 2235/80; C04B 2235/9646
See application file for complete search history.

(56) References Cited

U.S. PATENT DOCUMENTS

| | | | |
|---|---|---|---|
| 11,721,574 B2 * | 8/2023 | Horiuchi | H01L 21/68757 361/234 |
| 2004/0032208 A1 | 2/2004 | Wu et al. | |

| | | | |
|---|---|---|---|
| 2004/0033307 A1 | 2/2004 | Wu et al. | |
| 2004/0033752 A1 | 2/2004 | Wu et al. | |
| 2005/0202157 A1 | 9/2005 | Wu et al. | |
| 2008/0187746 A1 | 8/2008 | De Graaf et al. | |
| 2008/0283853 A1 | 11/2008 | Mitani et al. | |
| 2009/0166651 A1 | 7/2009 | Beckers | |
| 2010/0231120 A1 | 9/2010 | Mitani et al. | |
| 2011/0181173 A1 | 7/2011 | De Graaf et al. | |
| 2013/0256599 A1 * | 10/2013 | Irie | C04B 35/62695 252/301.4 R |
| 2016/0025294 A1 | 1/2016 | Dijken et al. | |
| 2019/0233333 A1 | 8/2019 | Moteki et al. | |

FOREIGN PATENT DOCUMENTS

| | | |
|---|---|---|
| CN | 101044635 A | 9/2007 |
| CN | 101370908 A | 2/2009 |
| CN | 112979282 A | 6/2021 |
| JP | 2003-500805 | 1/2003 |
| JP | 2004-172421 A | 6/2004 |
| JP | 2005-132861 A | 5/2005 |
| JP | 2008-521238 | 6/2008 |
| JP | 2008-533270 | 8/2008 |
| JP | 2012-060179 | 3/2012 |
| JP | 2013-56999 A | 3/2013 |
| JP | 2014-132084 A | 7/2014 |
| JP | 2016-519829 | 7/2016 |
| JP | 2018-2488 | 1/2018 |

OTHER PUBLICATIONS

Japanese Office Action issued Dec. 3, 2204 in corresponding Japanese application No. 2021-145985; English machine translation included (6 pages).
Chinese Office Action dated Jul. 30, 2025 issued in corresponding Chinese application No. 202211093469.5; English translation included (16 pages).
Taiwanese Office Action dated Nov. 21, 2025 issued in corresponding Taiwanese application No. 111133809; English translation included (7 pages).

* cited by examiner

*Primary Examiner* — C Melissa Koslow

(74) *Attorney, Agent, or Firm* — Rankin, Hill & Clark LLP

(57) ABSTRACT

A ceramic composition is provided. The ceramic composition includes a corundum phase, and a $CeAl_{11}O_{18}$ phase. A ratio of an amount of substance of the $CeAl_{11}O_{18}$ phase with respect to a total amount of substance of the ceramic composition is not lower than 0.5 mol % and not higher than 5 mol %.

8 Claims, 5 Drawing Sheets

CERAMIC COMPOSITION AND METHOD FOR MANUFACTURING CERAMIC COMPOSITION

This application claims priority from Japanese Patent Applications No. 2021-145985, filed on Sep. 8, 2021, the entire contents of which are herein incorporated by reference.

BACKGROUND

Technical Field

The present disclosure relates to a ceramic composition and a method for manufacturing the ceramic composition.

Background Art

In general, 90 to 99.9 wt % or more alumina ceramic may be, for example, used for a component for mounting a semiconductor. The alumina ceramic is excellent in mechanical strength, thermal conductivity, electric insulation, etc., and a process of manufacturing the alumina ceramic is also stable and inexpensive. Therefore, the alumina ceramic is widely used in various industrial fields (see e.g., JP-A-2018-002488, JP-A-2016-519829, JP-A-2012-060179, JP-A-2008-533270, JP-A-2008-521238, and JP-A-2003-500805).

However, when, for example, a ceramic composition such as the alumina ceramic is required to have a light emission function, a step of applying a fluorescent material or the like is necessary, which thereby causes a problem of increasing manufacturing cost of the ceramic composition. Moreover, addition of a compound with fluorescent properties to the ceramic is also considered. However, also in this case, the manufacturing cost of the ceramic composition increases due to the addition of the compound in which various materials are combined. Furthermore, there is also a problem that advantages such as the mechanical strength, the thermal conductivity, etc. of the ceramic serving as a functional or structural component are impaired as an amount of the added compound increases.

The present disclosure has been accomplished in view of these points. The present disclosure provides a ceramic composition that is made of an inexpensive material with a light emission function, and a method for manufacturing the ceramic composition.

SUMMARY

Certain embodiment provides a ceramic composition including a corundum phase, and a $CeAl_{11}O_{18}$ phase. A ratio of an amount of substance of the $CeAl_{11}O_{18}$ phase with respect to a total amount of substance of the ceramic composition is not lower than 0.5 mol % and not higher than 5 mol %.

Certain embodiment provides a method for manufacturing a ceramic composition. The method includes: blending powder of cerium oxide and powder of aluminum oxide with each other to thereby obtain a mixture material; molding the mixture material to thereby obtain a green compact; and firing the green compact at a temperature not lower than 14000 and not higher than 17000 in a reducing atmosphere to thereby obtain a ceramic composition comprising a corundum phase and a $CeAl_{11}O_{18}$ phase. A ratio of an amount of substance of the $CeAl_{11}O_{18}$ phase with respect to a total amount of substance of the ceramic composition is not lower than 0.5 mol % and not higher than 5 mol %.

DESCRIPTION OF EMBODIMENT

An embodiment of a ceramic composition and a method for manufacturing the ceramic composition disclosed by the present application will be described below in details with reference to the drawings. Incidentally, the present disclosure is not limited by the embodiment.

Figure 1:
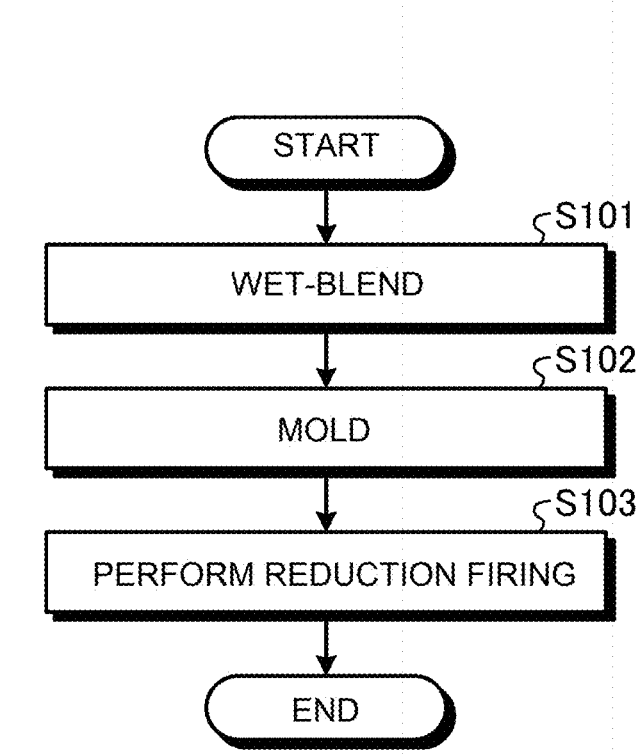
FIG. 1 is a flow chart showing a method for manufacturing a ceramic composition according to an embodiment.

FIG. 1 is a flow chart showing a method for manufacturing a ceramic composition according to an embodiment. The ceramic composition is formed of aluminum oxide and cerium, and emits photoluminescence light, which is, for example, an electromagnetic wave in a wavelength range of 300 nm to 550 nm, in response to, for example, radiation of an electromagnetic wave in a wavelength range of 250 nm to 402 nm.

First, powder of cerium oxide ($CeO_2$) with purity of 99.9 wt % is added to powder of aluminum oxide with purity of 99.99 wt % and an average particle size of less than 1 μm. Here, a ratio (mole fraction) of an amount of substance of the cerium oxide with respect to a total amount of substance of the powder of the aluminum oxide and the powder of the cerium oxide is not lower than 0.5 mol % and not higher than 5 mol %. More preferably, the ratio (mole fraction) of the amount of substance of the cerium oxide with respect to the total amount of substance of the powder of the aluminum oxide and the powder of the cerium oxide is not lower than 0.5 mol % and not higher than 1 mol %. An organic binder component and a plasticizer component are added to these powders and wet-blended in an alcohol-based liquid medium (step S101).

A slurry-like material obtained by the wet blending is molded into a predetermined shape such as a tape shape, for example, by a doctor blade method (step S102). Incidentally, the shape of a resulting green compact is not limited to the tape shape, but may be any shape.

The green compact is subjected to reduction firing at a temperature not lower than 1400° C., preferably not lower than 1500° C., and not higher than 1700° C., for example, in a nitrogen gas atmosphere containing hydrogen so that a sintered compact is obtained (step S103). In particular, in the process of the step S103, the nitrogen gas containing the hydrogen is introduced into an electric furnace where the sintered compact is placed. Therefore, the green compact is fired in a reducing atmosphere. The sintered compact is a ceramic composition containing $CeAl_{11}O_{18}$ and has a light emission function.

Figure 2:
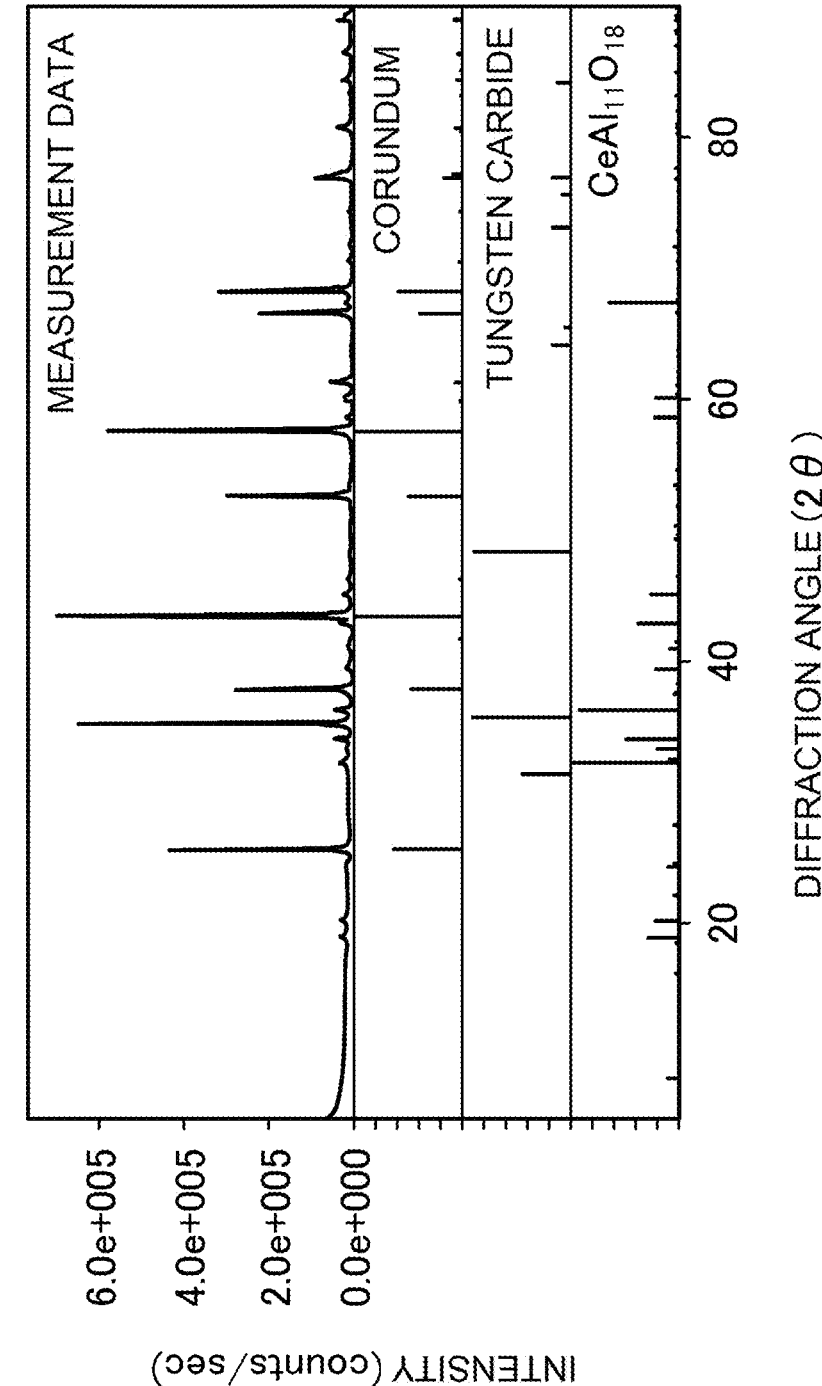
FIG. 2 is a view showing composition of the ceramic composition according to the embodiment.

FIG. 2 is a graph showing an X-ray diffraction pattern of a sample in which the ceramic composition formed in the aforementioned manner is powdered.

As shown in FIG. 2, measurement data obtained from the sample mostly consists of a corundum phase, and includes a $CeAl_{11}O_{18}$ phase resulting from the added cerium oxide. That is, it can be understood that the ceramic composition includes two phases, i.e. the corundum phase and the $CeAl_{11}O_{18}$ phase. Incidentally, tungsten carbide is also detected from the measurement data, but this is a foreign matter (contamination) resulting from a pulverizing media material used to obtain the sample.

In the present embodiment, the ratio (mole fraction) of the amount of substance of the cerium oxide with respect to the total amount of substance of the powder of the aluminum oxide and the powder of the cerium oxide is not lower than 0.5 mol % and not higher than 5 mol % in the process of the step S101. Therefore, in the ceramic composition according to the present embodiment, the ratio of the amount of substance of the $CeAl_{11}O_{18}$ phase with respect to the total amount of substance of the ceramic composition is not lower than 0.5 mol % and not higher than 5 mol %.

In this respect, more preferably, the ratio of the amount of substance of the $CeAl_{11}O_{18}$ phase to the total amount of substance of the ceramic composition may be not lower than 0.5 mol % and not higher than 1 mol %. In such a case, an addition amount of the powder of the cerium oxide can be reduced more greatly. Accordingly, an expense required for manufacturing the ceramic composition can be reduced more greatly. Further, even in a case where the mole fraction of the $CeAl_{11}O_{18}$ phase is low, light emission characteristic (such as a light emission spectrum) of the ceramic composition does not change much.

In addition, the corundum phase forms a continuous phase, that is a main constituent phase, and the $CeAl_{11}O_{18}$ phase is present in a dispersed manner. Specifically, a backscattered electron image of the ceramic composition in a polished surface is shown in FIG. 3.

Figure 3:
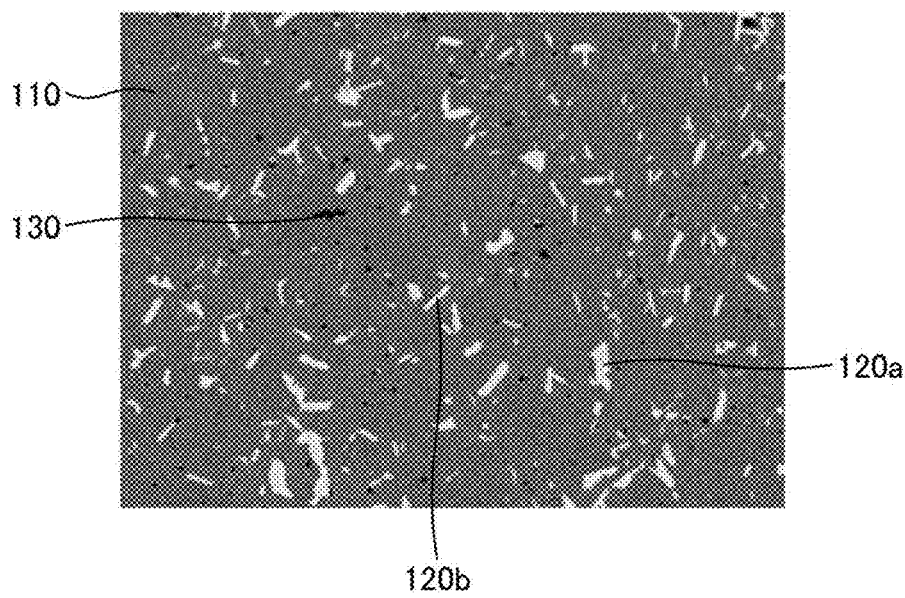
FIG. 3 is a view showing structure of the ceramic composition according to the embodiment.

As shown in FIG. 3, the ceramic composition according to the present embodiment has a corundum phase 110, which forms a continuous phase illustrated in gray in FIG. 3, and $CeAl_{11}O_{18}$ phase crystals 120a and 120b illustrated in white in FIG. 3. The $CeAl_{11}O_{18}$ phase crystals 120a and 120b are present in a dispersed manner inside the corundum phase 110. In FIG. 3, the crystal 120a is planar, whereas the crystal 120b is linear. The reason for this is considered as follows. That is, each of the $CeAl_{11}O_{18}$ phase crystals 120a and 120b has a flat plate shape. The crystal 120a is observed from the front while the crystal 120b is observed from the side. Incidentally, since the ceramic composition is manufactured by firing, the corundum phase 110 contains pores 130 illustrated in black in FIG. 3.

Thus, the ceramic composition is composed of two phases, i.e. a corundum phase that forms a continuous phase, and a $CeAl_{11}O_{18}$ phase dispersed therein. Therefore, the ceramic composition is a material that has mechanical strength, thermal conductivity and electrical insulation comparable to an alumina ceramic and can be used as various functional or structural components. In addition, the method for manufacturing the ceramic composition except for blending of the cerium oxide is also applicable to manufacturing of an ordinary alumina ceramic, and manufacturing cost is not increased. That is, the ceramic composition according to the present embodiment can be manufactured inexpensively.

Figure 4:
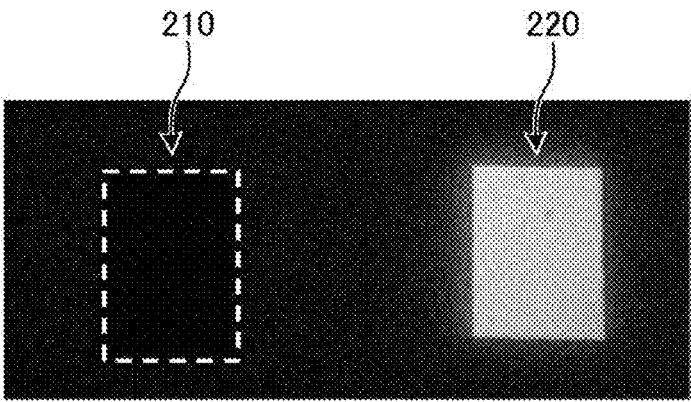
FIG. 4 is a view showing a specific example of light emission of the ceramic composition.

FIG. 4 is a view showing a specific example of light emission of the ceramic composition according to the present embodiment. That is, FIG. 4 shows a state in a case where a normal alumina ceramic 210 and a ceramic composition 220 in which cerium is added are irradiated with ultraviolet light whose peak wavelength is 254 nm.

As shown in FIG. 4, the normal alumina ceramic 210 does not emit light under the ultraviolet light irradiation. On the other hand, in the case where the ceramic composition 220 is irradiated with the ultraviolet light, the ceramic composition 220 according to the preset embodiment emits light intensely. As mentioned above, the ceramic composition 220 according to the present embodiment contains 0.5 mol % or more cerium oxide. Accordingly, intensity of photoluminescence light emitted from the ceramic composition 220 is sufficiently large. In a case where a peak wavelength of the ultraviolet light with which the ceramic composition 220 is irradiated is 254 nm, an emission color of the light emitted from the ceramic composition 220 is, for example, blue-white. The emission color changes as the peak wavelength of the excitation light changes.

Figure 5:
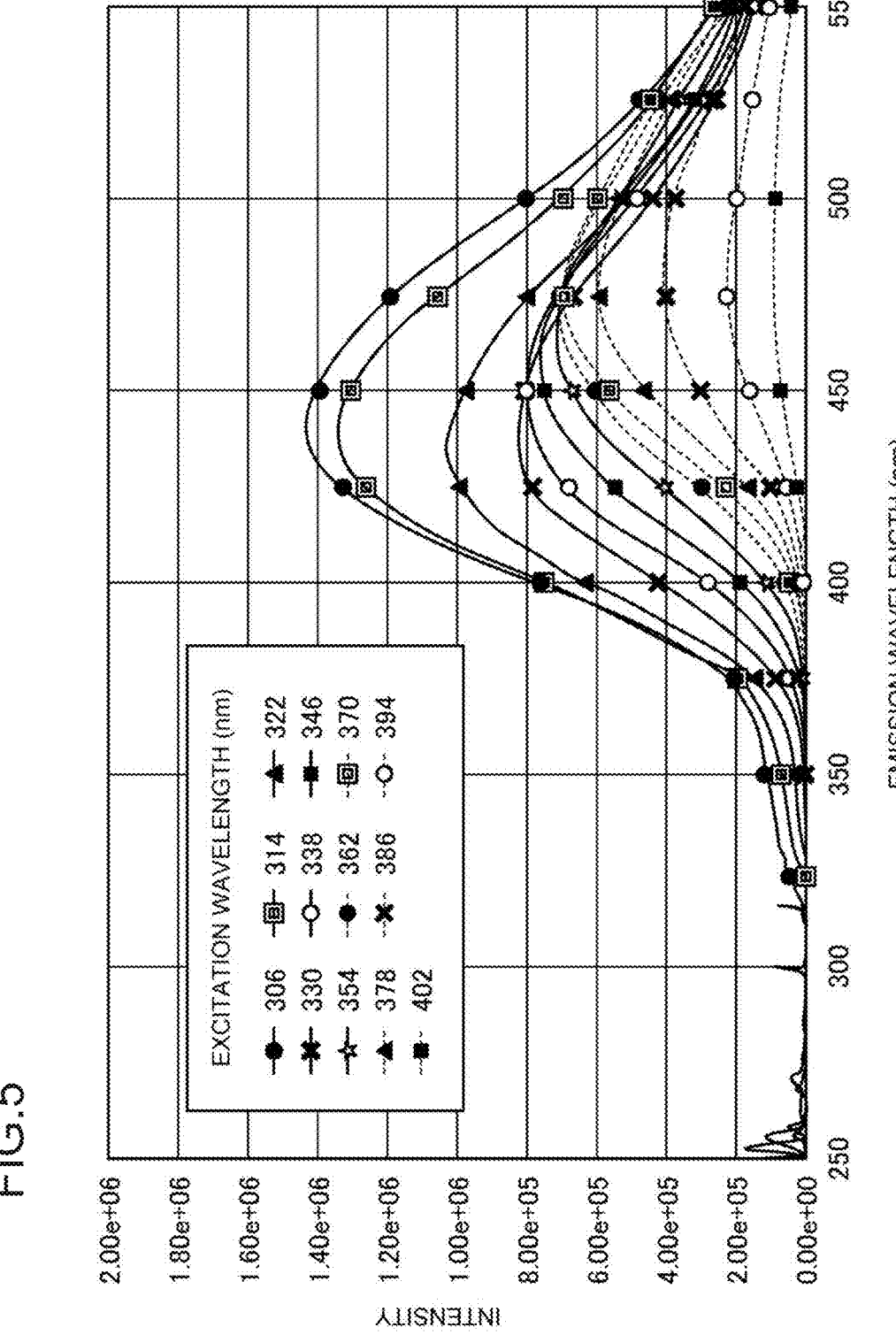
FIG. 5 is a view showing specific examples of excitation wavelength and emission wavelength.

FIG. 5 is a view showing a specific example of the relationship between the peak wavelength of the excitation light with which the ceramic composition is irradiated and an emission wavelength of light that is emitted from the ceramic composition. FIG. 5 shows an emission spectrum of the light emitted from the ceramic composition according to the present embodiment in a case where the peak wavelength of the excitation light with which the ceramic composition is irradiated is in a range of from 306 nm to 402 nm. However, the ceramic composition according to the present embodiment emits light in an emission wavelength range of from 300 nm to 550 nm as long as the peak wavelength of the excitation light is not shorter than 250 nm.

In a case where the peak wavelength of the excitation light is in the range of from 306 nm to 322 nm, as shown in FIG. 5, the peak wavelength of the light emitted from the ceramic composition shifts gradually from approximately 440 nm toward a shorter wavelength side and peak intensity of the light emitted from the ceramic composition decreases, as the peak wavelength of the excitation light increases. In addition, in a case where the peak wavelength of the excitation light is not longer than 314 nm, light emission of the ceramic composition is observed around the emission wavelength of 350 nm. On the other hand, in a case where the peak wavelength of the excitation light is not shorter than 322 nm, light emission of the ceramic composition is not observed in a wavelength band around 350 nm.

Moreover, in a case where the ceramic composition is irradiated with the excitation light whose peak wavelength is not shorter than 314 nm, the peak intensity of the light emitted from the ceramic composition decreases as the peak wavelength of the excitation light increases. Further, in such a case, the intensity of the light emitted from the ceramic composition decreases in a wavelength band of 315 nm to 400 nm.

On the other hand, in a case where the peak wavelength of the excitation light is not shorter than 330 nm, the peak wavelength of the light emitted from the ceramic composition shifts gradually from approximately 440 nm toward a longer wavelength side to reach about 480 nm and the peak intensity of the light emitted from the ceramic composition decreases slightly, as the peak wavelength of the excitation light increases. In a case where the peak wavelength of the excitation light is not shorter than 322 nm, light emission of the ceramic composition ceases around the emission wavelength of 350 nm.

The $CeAl_{11}O_{18}$ contained in this ceramic composition according to the present embodiment has a strained magnetoplumbite-type structure but has a non-stoichiometric composition. Therefore, it is considered that partial substitutions or defects are present in the $CeAl_{11}O_{18}$. It is considered that, as a result of such partial substitutions or defects affecting the $CeAl_{11}O_{18}$, which is present to be surrounded by the corundum phase, the peak wavelength of the light emitted from the ceramic composition also changes due to the change of the peak wavelength of the excitation light.

Thus, when the peak wavelength of the excitation light changes, the peak wavelength of the light emitted from the ceramic composition and the intensity of the emitted light change. Accordingly, by irradiating the ceramic composition with the electromagnetic waves (excitation light) with the different wavelengths, the color of the light emitted from the ceramic composition can be changed. In other words, the wavelength of the excitation light (particularly the type of the ultraviolet light) with which the ceramic composition is irradiated can be identified by the color of the light emitted from the ceramic composition. Thus, in the ceramic composition according to the present embodiment, the type of the ultraviolet light can be identified through the change of the color of the light emitted from the ceramic composition. Accordingly, it is possible to apply a member composed of the ceramic composition to a semiconductor manufacturing apparatus.

According to the present embodiment, as described above, the ceramic composition including the two phases, i.e. the corundum phase that forms the continuous phase and the $CeAl_{11}O_{18}$ phase that is dispersed in the continuous phase can be obtained by simple steps. Therefore, it is possible to obtain a material that has a light emission function while having mechanical strength, thermal conductivity, and electrical insulation comparable to an alumina ceramic. That is, it is possible to provide an inexpensive material with a light emission function.

Although the preferred embodiments etc. have been described above in detail, the present disclosure is not limited to the aforementioned embodiments etc., and various modifications and substitutions can be added to the aforementioned embodiments etc. without departing from the scope described in Claims.

What is claimed is:

1. A ceramic composition comprising a corundum phase and a $CeAl_{11}O_{18}$ phase,
   wherein:
   a ratio of an amount of substance of the $CeAl_{11}O_{18}$ phase with respect to a total amount of substance of the ceramic composition is not lower than 0.5 mol % and not higher than 5 mol %;
   the ceramic composition emits light when irradiated with excitation light;
   when the ceramic composition is irradiated with the excitation light whose peak wavelength is in a range of 250 nm to 402 nm, a peak wavelength of the light emitted from the ceramic composition is in a range of 300 nm to 550 nm; and
   when the ceramic composition is irradiated with excitation light whose peak wavelength is not shorter than 314 nm, peak intensity of the light emitted from the ceramic composition decreases as the peak wavelength of the excitation light increases.

2. The ceramic composition according to claim 1, wherein the ratio of the amount of substance of the $CeAl_{11}O_{18}$ phase with respect to the total amount of substance of the ceramic composition is not lower than 0.5 mol % and not higher than 1 mol %.

3. The ceramic composition according to claim 1, wherein the corundum phase forms a continuous phase; and
   the $CeAl_{11}O_{18}$ phase is dispersed in the continuous phase.

4. A ceramic composition comprising a corundum phase and a $CeAl_{11}O_{18}$ phase,
   wherein:
   a ratio of an amount of substance of the $CeAl_{11}O_{18}$ phase with respect to a total amount of substance of the ceramic composition is not lower than 0.5 mol % and not higher than 5 mol %;
   the ceramic composition emits light when irradiated with excitation light;
   when the ceramic composition is irradiated with the excitation light whose peak wavelength is in a range of 250 nm to 402 nm, a peak wavelength of the light emitted from the ceramic composition is in a range of 300 nm to 550 nm; and
   when the ceramic composition is irradiated with excitation light whose peak wavelength is not shorter than 314 nm, intensity of the light emitted from the ceramic composition in a wavelength band of 315 nm to 400 nm decreases as the peak wavelength of the excitation light increases.

5. The ceramic composition according to claim 4, wherein the ratio of the amount of substance of the $CeAl_{11}O_{18}$ phase with respect to the total amount of substance of the ceramic composition is not lower than 0.5 mol % and not higher than 1 mol %.

6. The ceramic composition according to claim 4, wherein the corundum phase forms a continuous phase; and
   the $CeAl_{11}O_{18}$ phase is dispersed in the continuous phase.

7. A method for manufacturing a ceramic composition, comprising:
   blending powder of cerium oxide and powder of aluminum oxide with each other to thereby obtain a mixture material;
   molding the mixture material to thereby obtain a green compact; and
   firing the green compact at a temperature not lower than 1400° and not higher than 1700° in a reducing atmosphere to thereby obtain a ceramic composition comprising a corundum phase and a $CeAl_{11}O_{18}$ phase,
   wherein a ratio of an amount of substance of the $CeAl_{11}O_{18}$ phase with respect to a total amount of substance of the ceramic composition is not lower than 0.5 mol % and not higher than 5 mol %.

8. The method according to claim 7, wherein in obtaining the ceramic composition, nitrogen gas containing hydrogen is introduced into a space where the ceramic composition is placed.

* * * * *